(12) United States Patent
Boillot et al.

(10) Patent No.: US 9,541,755 B2
(45) Date of Patent: Jan. 10, 2017

(54) PROTECTIVE NOZZLE FOR A LASER CAMERA

(71) Applicant: SERVO-ROBOT INC., Saint-Bruno (CA)

(72) Inventors: Jean-Paul Boillot, Saint-Bruno (CA); Marian Rusnac, Longueuil (CA)

(73) Assignee: Servo-Robot Inc., Saint-Bruno, Quebec (CA)

( * ) Notice: Subject to any disclaimer, the term of this patent is extended or adjusted under 35 U.S.C. 154(b) by 461 days.

(21) Appl. No.: 14/250,714

(22) Filed: Apr. 11, 2014

(65) Prior Publication Data

US 2015/0293351 A1    Oct. 15, 2015

(51) Int. Cl.
| H01J 40/14 | (2006.01) |
| H01L 27/00 | (2006.01) |
| G02B 27/00 | (2006.01) |
| B23K 31/12 | (2006.01) |
| H04N 5/225 | (2006.01) |

(52) U.S. Cl.
CPC ......... *G02B 27/0006* (2013.01); *B23K 31/125* (2013.01); *H04N 5/2252* (2013.01)

(58) Field of Classification Search
CPC ............. G02B 27/0006; B23K 31/125; H04N 1/00519; H04N 5/2252; H04N 5/64; H04N 2201/02479; H04N 2201/02481; H04N 2201/02483

USPC ..... 250/208.1, 216, 239; 257/433, 434, 678, 257/680; 438/64, 65, 66, 69, 73, 106, 115, 116, 438/12

See application file for complete search history.

(56) References Cited

U.S. PATENT DOCUMENTS

| 4,859,829 | A | 8/1989 | Dufour |
| 5,264,678 | A | 11/1993 | Powell et al. |
| 5,442,155 | A | 8/1995 | Nihei et al. |
| 6,270,222 | B1 | 8/2001 | Herpst |
| 7,138,640 | B1 * | 11/2006 | Delgado ................. G01N 21/15 250/372 |
| 7,557,326 | B2 | 7/2009 | Boillot et al. |
| 2003/0142403 | A1 * | 7/2003 | Kalley ..................... G01J 5/02 359/509 |
| 2008/0205878 | A1 * | 8/2008 | Owashi .................... B08B 5/04 396/429 |

* cited by examiner

*Primary Examiner* — Pascal M Bui Pho
(74) *Attorney, Agent, or Firm* — Muirhead and Saturnelli, LLC

(57) ABSTRACT

A protective nozzle for protecting a frontal optical portion of a laser camera has a body attachable to the laser camera, apertures extending through the body, a transparent plate extending crosswise to and blocking each aperture on a back side of the body, contouring air pockets recessed in the back side of the body, under the transparent plate and extending around the apertures with lips projecting around the apertures to define air gaps for escape of pressurized air from the contouring air pockets toward the apertures in a form of centripetal air jets along the transparent plate, and an air passage arrangement extending in the body from an air inlet located on a side of the body for receiving pressurized air to the contouring air pockets.

19 Claims, 4 Drawing Sheets

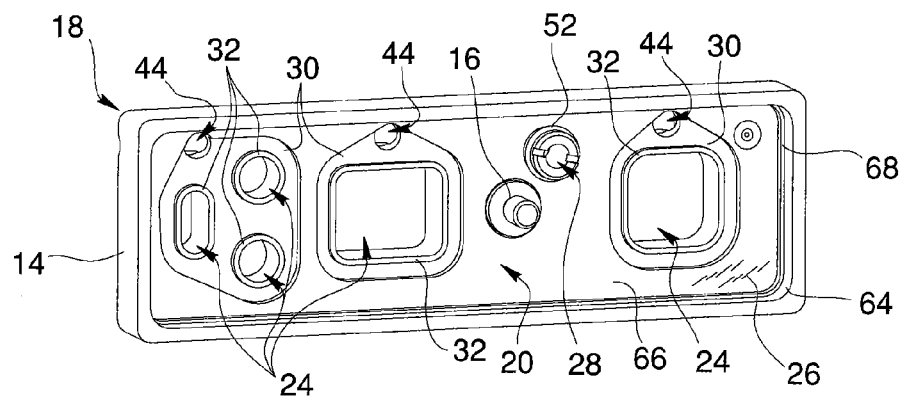
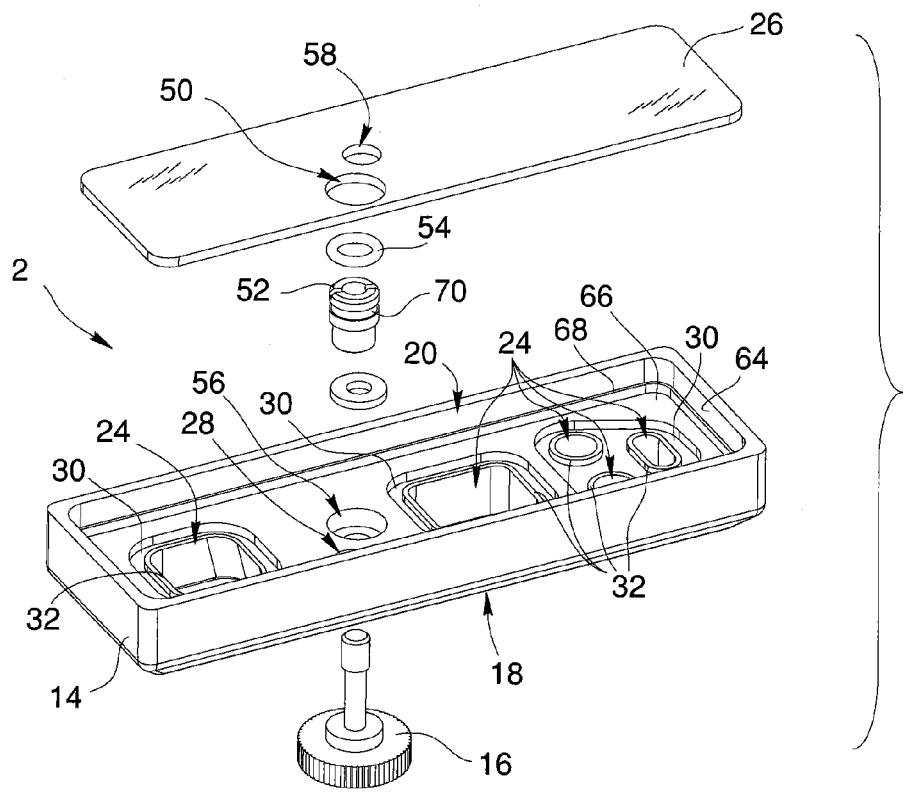

PROTECTIVE NOZZLE FOR A LASER CAMERA

FIELD OF THE INVENTION

The present invention relates to a protective nozzle for a laser camera for example as used in the welding industry and often innerly cooled by pressurized air, and more particularly to a protective nozzle for protecting a frontal optical portion of such a laser camera, where lenses or windows for optical sensors that need to be protected against contamination such as welding fumes may be located.

BACKGROUND

A laser camera used for tracking, monitoring or inspection of laser or arc welding has one or more transparent windows or lenses that transmit optical signals in or out of the camera enclosure. Such a laser camera is often used in robotic processes and requires protection for long periods of welding against welding fumes that could contaminate the transparent windows or lenses. External air knifes or jets are often used to protect these windows or lenses against contaminating welding fumes or other contamination. U.S. Pat. No. 4,859,829 (Dufour), U.S. Pat. No. 5,264,678 (Powell et al.), U.S. Pat. No. 5,442,155 (Nihei et al.), U.S. Pat. No. 6,270,222 (Herpst) and U.S. Pat. No. 7,557,326 (Boillot et al.) provide examples of laser cameras of the prior art, some of which including protection against welding fumes. In the prior art, the camera windows or lenses are sometimes protected by air jet covering only a partial portion of the aperture contour, as illustrated on FIG. 7. In such prior art devices, air pressure is applied on the internal surface of a protective plate of the window and notches on the other side of the protective plate, covering only a part of the aperture contour, allow air to escape outside as depicted by the arrows in FIG. 7. Such a construction provides only partial protection of the window area and unsatisfactory long term protection, especially for large and numerous apertures. Also, fluctuating air pressure sometimes causes undesired vibration of the protective plate in the window and rapid contamination and even detrimental suction of the contaminating fumes toward the optical sensors of the laser camera, especially when different plates are used to replace the initial plate.

SUMMARY

An object of the invention is to provide a protective nozzle for protecting a frontal optical portion of a laser camera, which overcomes the aforesaid drawbacks of the prior art.

Another object of the invention is to provide such a protective nozzle which, when the laser camera is innerly cooled by pressurized air, may operate from pressurized air coming from the laser camera.

Another object of the invention is to provide such a protective nozzle which may have a construction with a single transparent plate facilitating replacement of the transparent plate when necessary.

According to an aspect of the invention, there is provided a protective nozzle for protecting a frontal optical portion of a laser camera, the protective nozzle comprising:

a body attachable to the laser camera, the body having opposite front and back sides and being sized and shaped to cover the frontal optical portion of the laser camera when attached thereto with the back side of the body in direction of the laser camera;

at least one aperture extending through the body between the front and back sides;

a transparent plate extending crosswise to and blocking each aperture on the back side of the body;

an air inlet located on a side of the body for receiving pressurized air;

for each aperture, a contouring air pocket recessed in the back side of the body under the transparent plate and extending around and spaced from the aperture to form a lip projecting around the aperture toward the transparent plate, the lip having a distal surface spaced from the transparent plate to define an air gap for escape of pressurized air from the contouring air pocket toward the aperture in a form of a centripetal air jet along the transparent plate; and an air passage arrangement extending in the body from the air inlet to each contouring air pocket.

The following provides an outline of certain possibly preferable or advantageous features of the invention which are to be considered non-restrictively and which will be more fully described hereinafter.

The clever design of the protective nozzle of the invention thus allows laser camera protection without involving air pressure applied on the internal side of a transparent plate protecting the laser camera, and needs no external air jet and pressurized air supply connection when the laser camera is innerly cooled by pressurized air. The integrated air jets are provided by internal passages and gaps that produce a calibrated air jet all around each optical aperture and deviate fumes or other contaminants out of and away from the aperture areas. The protective nozzle according to the invention offers many advantages such as compactness, no external pressurized air supply connection necessity when the laser camera is innerly cooled by pressurized air, better protection against welding fume contamination even when the apertures are large and multiple, longer use between replacements of the transparent plate, and fast and easy replacement of the plate when necessary. Another advantage is that a lower flow rate of pressurized air may be used, which is more economical and better for the welding, especially the welding of aluminum.

BRIEF DESCRIPTION OF THE DRAWINGS

A detailed description of preferred embodiments will be given herein below with reference to the following drawings:

FIG. 2 is a back side perspective view of a protective nozzle according to an embodiment of the invention.

FIG. 3 is an exploded side elevation perspective view of a protective nozzle according to an embodiment of the invention.

DETAILED DESCRIPTION OF THE PREFERRED EMBODIMENTS

Figure 1:
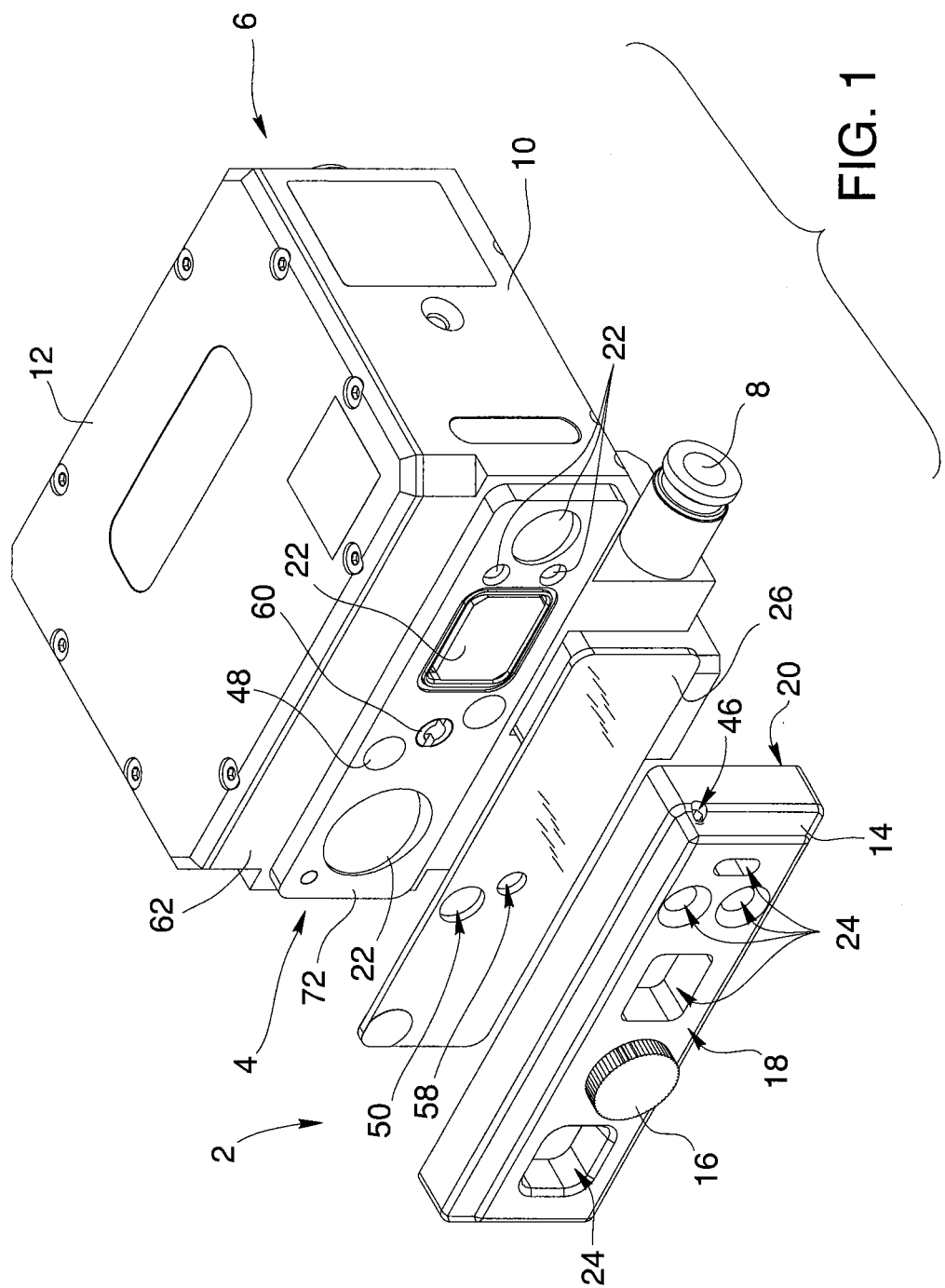
FIG. 1 is an exploded view of a laser camera provided with a protective nozzle according to an embodiment of the invention.

Referring to FIG. 1, there is shown a protective nozzle 2 for protecting a frontal optical portion 4 of a laser camera 6 innerly cooled by pressurized air as received through a side air inlet 8. The laser camera 6 may have an enclosure 10 provided with a top lid 12 that can be unscrewed to have access to optical sensors and other components (not shown) inside the laser camera 6. The frontal optical portion 4 may be provided with lenses or other optical devices 22 such as LEDs or simple holes for allowing passage of light or radiations as needed for the operation of the laser camera 6.

The protective nozzle 2 has a body 14 attachable to the laser camera 6, for example using a knurled bolt 16 screwable into a threaded hole 60 through the enclosure 10 of the laser camera 6. Other fastening arrangements may be used if desired, like clipping, clamping or bracket arrangements (not shown) depending on the shape and configuration of the laser camera 6 and of the protective nozzle 2 whose body 14 has opposite front and back sides 18, 20 and is sized and shaped to cover the frontal optical portion 4 of the laser camera 6 when attached to it with the back side 20 of the body 14 in direction of the laser camera 6.

The protective nozzle 2 has one or multiple apertures extending through the body between the front and back sides 18, 20. In the illustrated case, the protective nozzle has five apertures 24 for the five lenses or optical devices 22. A transparent plate 26 extends crosswise to and blocks each aperture 24 on the back side 20 of the body 14.

Figure 4:
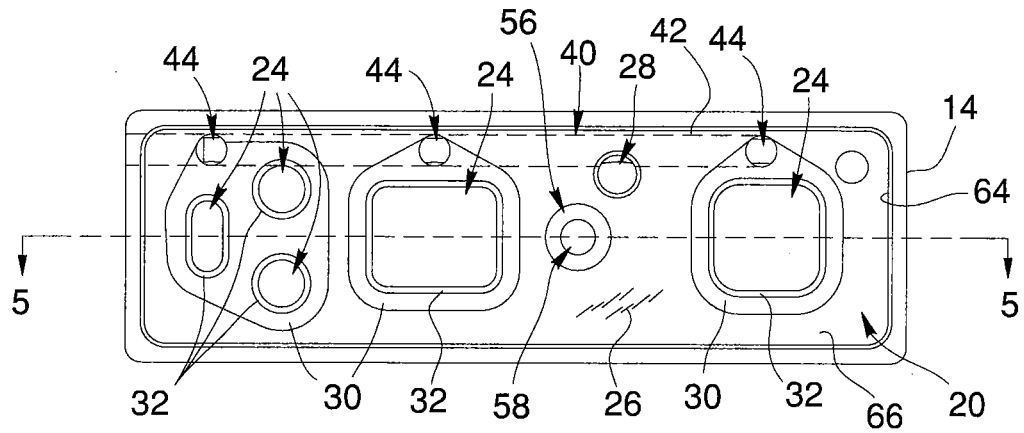
FIG. 4 is a back side view of a protective nozzle according to an embodiment of the invention.

Referring to FIGS. 2, 3 and 4, an air inlet 28 is located on the back side 20 of the body 14 for receiving pressurized air from the laser camera 6 (shown in FIG. 1). For each aperture 24, a contouring air pocket 30 is recessed in the back side 20 of the body 14 under the transparent plate 26 (as better seen in FIGS. 5 and 6) and extending around and spaced from the aperture 24 to form a lip 32 projecting around the aperture 24 toward the transparent plate 26.

Figure 5:
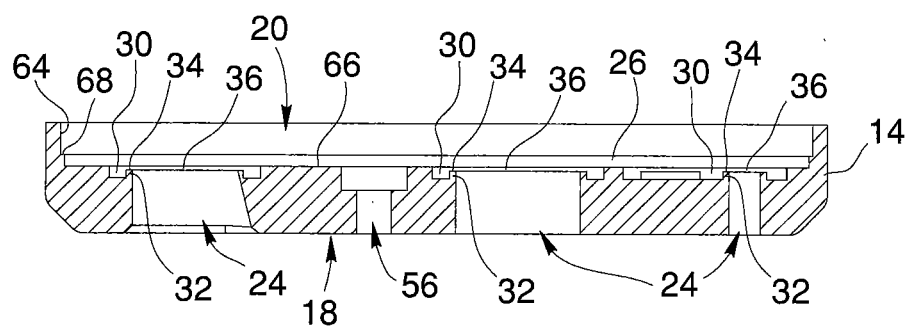
FIG. 5 is a cross-sectional view of the protective nozzle taken along the line 4-4 of FIG. 4.
Figure 6:
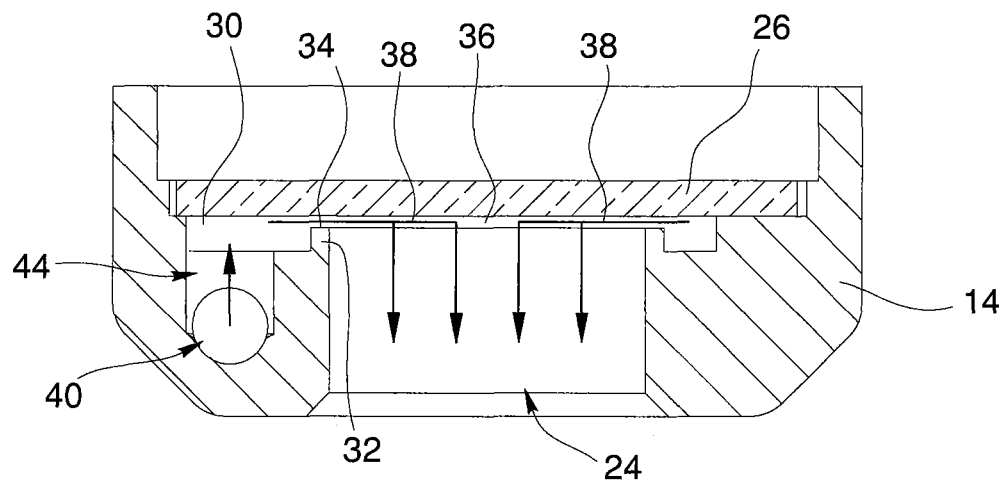
FIG. 6 is a schematic cross-sectional view of a protective nozzle illustrating air flow in the protective nozzle according to the invention.
Figure 7:
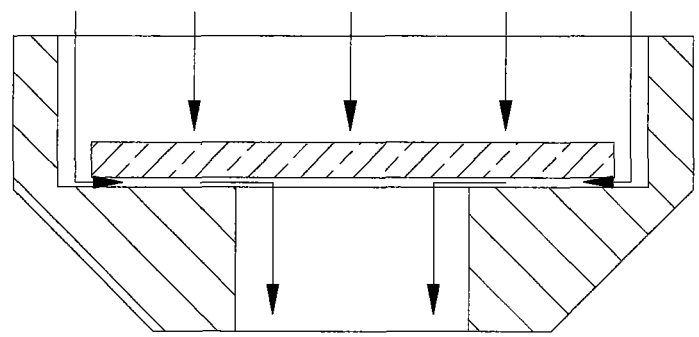
FIG. 7 is a schematic cross-sectional view of a protective arrangement of the prior art illustrating air flow in such arrangement.

Referring to FIGS. 5 and 6, each lip 32 has a distal surface 34 spaced from the transparent plate 26 to define an air gap 36 (as best shown in FIG. 6) for escape of pressurized air from the contouring air pocket 30 toward the aperture 24 in a form of a centripetal air jet along the transparent plate 26 as depicted by arrows 38 as shown in FIG. 6. The contouring air pockets 30 and/or the lips 32 may extend fully around the apertures 24, i.e. around the whole peripheries of the apertures 24, or may extend discontinuously around the apertures 24 if desired provided that the resulting arrangements form gaps 36 that produce the centripetal air jets along the transparent plate 26 where it blocks the apertures 24.

Referring to FIGS. 4 and 6, an air passage arrangement 40 extends in the body 14 from the air inlet 28 (shown in FIG. 4) to each contouring air pocket 30. The air passage arrangement 40 may take the form of an elongated air passage 42 as shown in staple lines in FIG. 4, longitudinally extending within the body 14. The elongated air passage 42 has an opening defining the air inlet 28 and openings defining air outlets 44 feeding respective contouring air pockets 30. The elongated air passage 42 may be bored from a lateral side of the body 14, a resulting bore opening in the lateral side being then closed with a stopper element 46 (as shown in FIG. 1) such as a set screw that may be screwed or otherwise fastened to the body 14. Likewise, the openings defining the air outlets 44 may be bored from the back side 20 of the body 14. In such configuration, the elongated air passage 42 has a generally straight course and the air outlets 44 are aligned with one another. The air passage arrangement 40 may have other suitable configurations depending for example on the locations of the apertures 24, and may be formed in other ways for example by molding in the case where the body 14 is made of assembled parts.

The air inlet 28 may be located on another side of the body 14 if desired, for example at the location of the stopper element 46 which then would be removed or not used. In such a case, an external air supply connection such as with a hose (not shown) may be used to bring pressurized air from the laser camera 6 or from another pressurized air supply source (not shown) to the air inlet 28.

Referring to FIG. 4, the contouring air packets 30 may have widening sections receiving the respective air outlets 44 of the elongated air passage 40 for example to facilitate a boring of the outlets 44 or for better distribution of the pressurized air in the contouring air pockets 30. Some of the apertures 24 may share a common contouring air pocket 30, particularly when the apertures 24 are smaller compared to the other ones in the body 14. Each air outlet 44 may have a diameter calibrated as function of a size and an area of the aperture 24 to be fed in pressurized air by the air outlet 44. The air pressure and the gap size may be calibrated on an empirical or a theoretical basis to ensure sufficient jet air speed to provide protection of the full aperture areas. Each air pocket 30 is thus fed by its own air inlet calibrated to insure sufficient air supply to provide adequate air jet velocity for each of the apertures 24 that can be of different size and area.

Referring to FIGS. 2 and 3, the back side 20 of the body 14 may conveniently have a recess sized and shaped to receive the transparent plate 26 in a blocking position of each aperture 24.

Referring to FIG. 3, when the transparent plate 26 extends across most of the back side 20 of the body 14 and there is not enough space left to position the air inlet 28 on a side of the transparent plate 26, or depending on where the pressurized air supply 48 (as shown in FIG. 1) from the laser camera 6 is located, then the transparent plate 26 may have a hole 50 aligned with the air inlet 28, and the air inlet 28 may be provided with a tubular element 52 projecting through the hole 50, for receiving pressurized air from the air supply 48. The tubular element 52 may be provided with a gasket 54 for sealing engagement with the transparent plate 26 to prevent leakage of pressurized air. The tubular element 52 may have a surrounding groove 70 into which the gasket 54 partially engages for better gasket support and positioning purposes.

When a knurled bolt 16 or like fastener element is used to attach the protective nozzle to the laser camera 6 (as shown in FIG. 1), then the body 14 may have a hole 56 extending between the front and back sides 18, 20 and the transparent plate 26 may also have a hole 58 aligned with the hole 56 in the body 14, so that the knurled bolt 16 is insertable from the front side 18 of the body 14 into the holes 56, 58 in the body 14 and in the transparent plate 26 and can be screwed into the threaded hole 60 (as shown in FIG. 1) for screw attachment of the protective nozzle 2 to the laser camera 6.

The body 14 may be made of heat conducting material resistant to welding spatters, such as copper or copper alloys. Other materials may be used if desired, depending on the environment where the laser camera 6 is to be used. The transparent plate 26 may be made of polycarbonate material or other suitable transparent plastics or materials, for example glass, quartz, fused silica and sapphire. The transparent plate 26 may advantageously be made in a single piece, for easier replacement when needed and economical reasons. However, it may be made of multiple pieces or in multiple sections adjoining one another or not if desired.

The frontal optical portion 4 of the laser camera 6 may project from a front side 62 of the laser camera 6 (as shown in FIG. 1). Then, the back side 20 of the body 14 may have a peripheral flange 64 defining a housing for snugly receiving the frontal optical portion 4 of the laser camera 6. The housing may have a depth substantially corresponding (with some play if desired) to a thickness of the transparent plate 26 and a thickness of the frontal optical portion 4 so that the transparent plate 26 is sandwiched between a bottom surface 66 of the housing and a front surface 72 of the frontal optical portion 4 (as shown in FIG. 1) when the body 14 is attached to the laser camera 6. The housing may have a bottom peripheral shoulder 68 defining a space snugly receiving the transparent plate 26 and against which the front surface 72 of the frontal optical portion 4 rests when the body 14 is attached to the laser camera 6.

Table I below provides an example of possible dimensions in millimeters (mm) for certain parts of the protective nozzle 2. The dimensions in table I are given for instructive purposes only and should not be considered as limitative in any way.

TABLE I

| | |
|---|---|
| overall nozzle height: | 32 mm |
| overall nozzle thickness: | 14 mm |
| lip width: | 0.8 mm |
| lip height: | 1 mm |
| air gap height: | 0.5 mm |
| air pocket width: | 2.2 mm |
| air passage diameter: | 3.2 mm |

The invention thus enables integration, in a compact camera nozzle 2, of various air inlets/outlets 28, 44, passages 40, air pockets 30 and calibrated gaps 36 around multiples apertures 24 between a single transparent plate 26 and a metal supporting body 14. A single central screw attachment 16, 60 can allow easy and fast replacement of the single transparent plate 26. The apertures 24 may be shielded by full contouring air jets with air gaps 34 covering the full contours of the apertures 24. The protective air jets involve no application of air pressure on the internal plate face, a central or near central screw attachment 16, 60 can tightly held the plate 26 in place, and no air pressure fluctuations may cause fumes being sucked inside the apertures 24. In the case of a laser camera 6 innerly cooled by pressurized air, air supply coming from the pressurized camera enclosure 10 makes it unnecessary to have separate external air supply (although such external air supply may be used if desired) while contributing to a neat and compact nozzle construction.

While embodiments of the invention have been illustrated in the accompanying drawings and described above, it will be evident to those skilled in the art that modifications may be made therein without departing from the invention.

The invention claimed is:

1. A protective nozzle for protecting a frontal optical portion of a laser camera, the protective nozzle comprising:
    a body attachable to the laser camera, the body having opposite front and back sides and being sized and shaped to cover the frontal optical portion of the laser camera when attached thereto with the back side of the body in direction of the laser camera;
    at least one aperture extending through the body between the front and back sides;
    a transparent plate extending crosswise to and blocking each aperture on the back side of the body;
    an air inlet located on a side of the body for receiving pressurized air;
    for each aperture, a contouring air pocket recessed in the back side of the body under the transparent plate and extending around and spaced from the aperture to form a lip projecting around the aperture toward the transparent plate, the lip having a distal surface spaced from the transparent plate to define an air gap for escape of pressurized air from the contouring air pocket toward the aperture in a form of a centripetal air jet along the transparent plate; and
    an air passage arrangement extending in the body from the air inlet to each contouring air pocket.

2. The protective nozzle according to claim 1, wherein said at least one aperture comprises multiple apertures, and the air passage arrangement comprises an elongated air passage longitudinally extending within the body, the elongated air passage having an opening defining the air inlet and openings defining air outlets feeding respective contouring air pockets.

3. The protective nozzle according to claim 2, wherein the elongated air passage is bored from a lateral side of the body, a resulting bore opening in the lateral side being closed with a stopper element.

4. The protective nozzle according to claim 2, wherein the elongated air passage has a generally straight course and the air outlets are aligned with one another.

5. The protective nozzle according to claim 2, wherein the contouring air pockets have widening sections receiving respective ones of the air outlets of the elongated air passage.

6. The protective nozzle according to claim 2, wherein some of the apertures share a common contouring air pocket.

7. The protective nozzle according to claim 2, wherein each air outlet has a diameter calibrated as function of a size and an area of each aperture fed in pressurized air by the air outlet.

8. The protective nozzle according to claim 1, wherein the back side of the body has a recess sized and shaped to receive the transparent plate in a blocking position of each aperture.

9. The protective nozzle according to claim 1, wherein the body has a hole extending between the front and back sides, the transparent plate has a hole aligned with the hole in the body, the protective nozzle further comprising a knurled bolt insertable from the front side of the body into the holes in the body and in the transparent plate for screw attachment of the protective nozzle to the laser camera.

10. The protective nozzle according to claim 1, wherein the body is made of heat conducting material resistant to welding spatters.

11. The protective nozzle according to claim 10, wherein the head conducting material comprises copper or copper alloys.

12. The protective nozzle according to claim 1, wherein the transparent plate is made of polycarbonate, glass, quartz, fused silica or sapphire material.

13. The protective nozzle according to claim 1, wherein the transparent plate is made in a single piece.

14. The protective nozzle according to claim 1, wherein the frontal optical portion of the laser camera projects from a front side of the laser camera, and the back side of the body has a peripheral flange defining a housing for snugly receiving the frontal optical portion of the laser camera.

15. The protective nozzle according to claim 14, wherein the housing has a depth substantially corresponding to a thickness of the transparent plate and a thickness of the frontal optical portion so that the transparent plate is sandwiched between a bottom surface of the housing and a front surface of the frontal optical portion when the body is attached to the laser camera.

16. The protective nozzle according to claim 15, wherein the housing has a bottom peripheral shoulder defining a space snugly receiving the transparent plate and against which the front surface of the frontal optical portion rests when the body is attached to the laser camera.

17. The protective nozzle according to claim 1, wherein the laser camera is innerly cooled by pressurized air, and the side of the body where the air inlet is located is the back side of the body for receiving the pressurized air from the laser camera.

18. The protective nozzle according to claim 17, wherein the transparent plate has a hole aligned with the air inlet, and the air inlet is provided with a tubular element projecting through the hole.

19. The protective nozzle according to claim 18, wherein the tubular element is provided with an O-ring extending between the transparent plate and a front surface of the frontal optical portion when the body is attached to the laser camera.

* * * * *